United States Patent

[11] 3,524,381

| [72] | Inventor | Matthew N. Miller<br>Topanga, California |
|---|---|---|
| [21] | Appl. No. | 721,761 |
| [22] | Filed | April 16, 1968 |
| [45] | Patented | Aug. 18, 1970 |
| [73] | Assignee | Fairchild Hiller Corporation<br>Bay Shore, Long Island, New York<br>a Corp. of Maryland |

[54] STORE LAUNCHING SYSTEM
9 Claims, 7 Drawing Figs.
[52] U.S. Cl. .................................................... 89/1.5,
244/63, 124/11, 244/137
[51] Int. Cl. ........................................................ F41f 5/02
[50] Field of Search............................................ 89/1.5;
124/11; 244/63, 137

[56] References Cited
UNITED STATES PATENTS
1,621,654  3/1927  Boos............................ 89/1.5

2,485,601  10/1949  Hickman...................... 89/8X
2,792,755  5/1957  Lahde........................... 244/63
2,937,573  5/1960  Gantschnigg................. 89/1.5

Primary Examiner— Samuel W. Engle
Attorney—Darby and Darby

ABSTRACT: The present invention includes a fluid pressure actuated store launching system having a cylinder assembly formed with an opening extending longitudinally therewithin and further formed with a slot communicating with the opening and the exterior of the cylinder, a piston assembly movably disposed within the cylinder opening and having an exterior portion projecting through said slot, said exterior portion including a spring-biased hinged rearward latch for engaging and urging a store during a launching stroke, and valve means for supplying fluid at a pressure which will cause said piston assembly to move within the cylinder assembly.

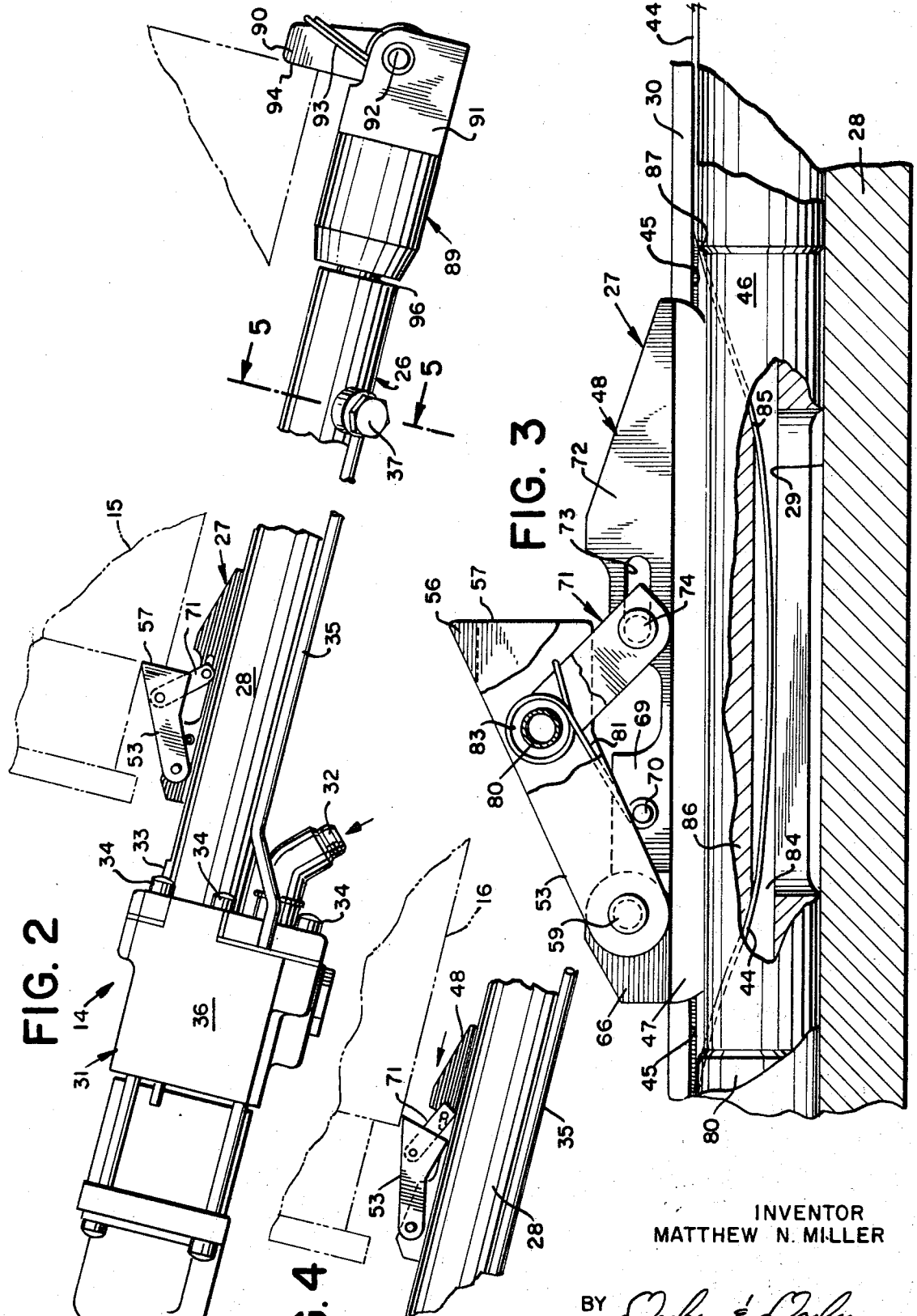

Patented Aug. 18, 1970
3,524,381
Sheet 3 of 3
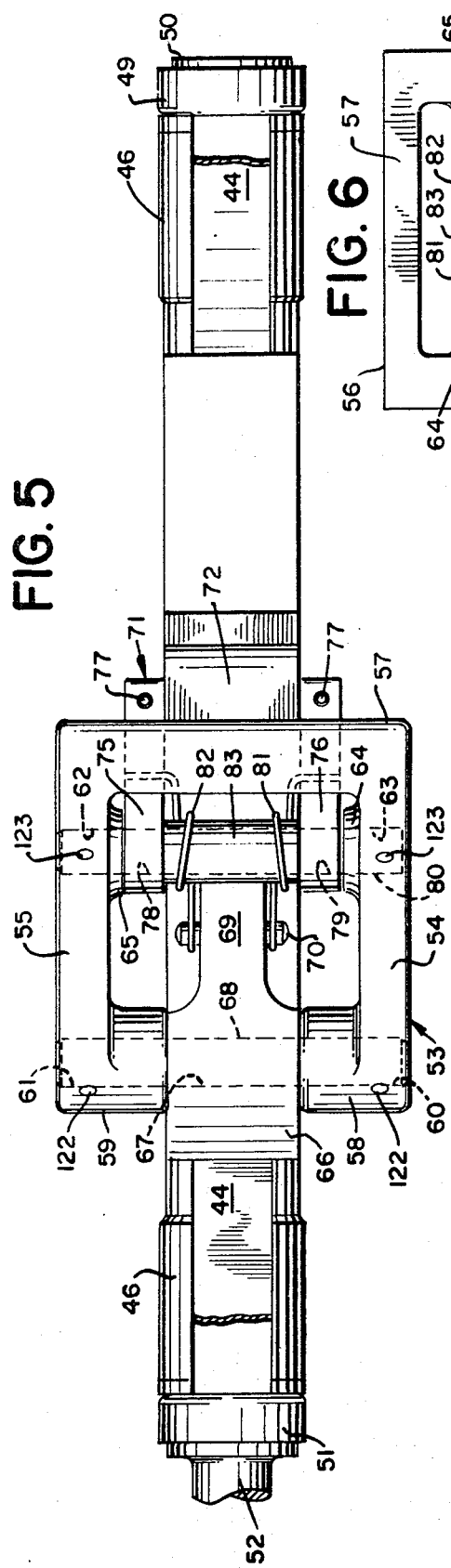
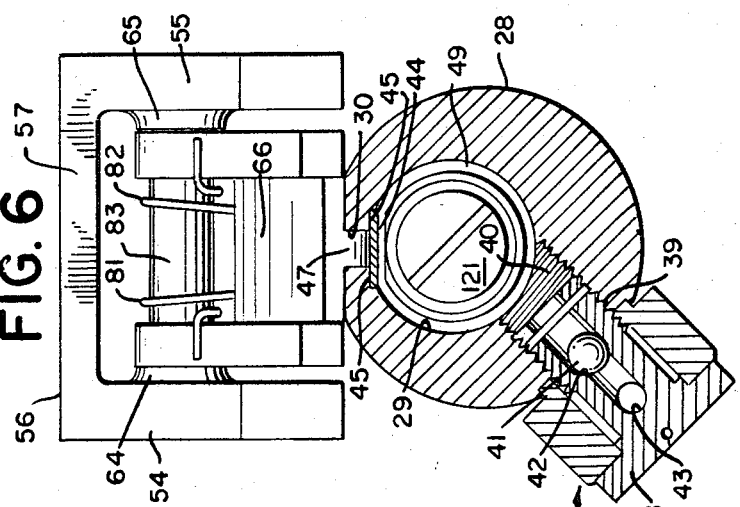
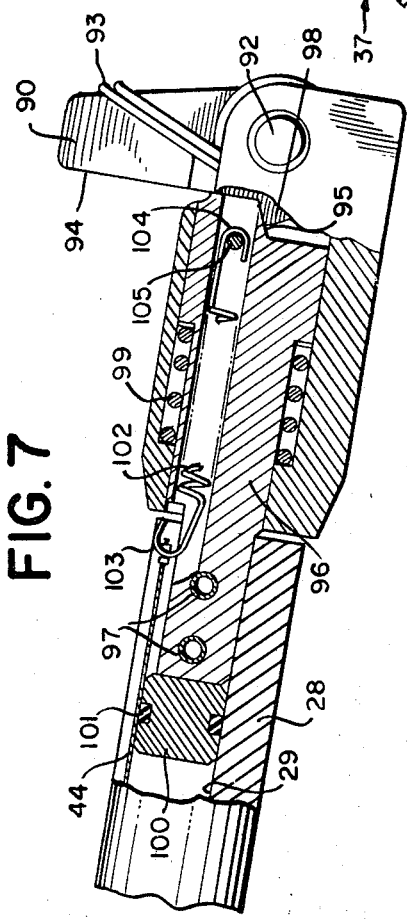
INVENTOR
MATTHEW N. MILLER
BY Darby & Darby
ATTORNEYS

STORE LAUNCHING SYSTEM

This invention relates to the launching of stores from a vehicle and more particularly to a fluid pressure actuated store launching system for use with an aircraft.

Many situations have arisen where it is desirable to launch or eject stores from a vehicle, such as an aircraft, in a rapid, predetermined and efficient manner. Flares, for example, are used to illuminate a given geographical area such that ground objects and possible targets may be seen from airborne vehicles. Usual cylinder and piston mechanisms which include a piston rod attached to the piston have proven to be impractical. Attempts to circumvent the use of such mechanisms with piston rods have resulted in cumbersome and mechanically complicated structures which do not lend themselves to rapid and efficient ejection of stores from, for example, a magazine.

It is an object of the present invention to provide a store launching system which is fluid pressure actuated and which includes a valved cylinder assembly within which a piston assembly is movably disposed.

Another object of the present invention is to provide a flare launching system which includes a piston assembly, a portion of which extends from a cylinder assembly to contact successive flares to be launched. The extending portion of the piston assembly of the present invention includes a scissor-like pivotal latch which provides a rigid launching arm during the launch stroke and which collapsibly engages successive flares during the return stroke to its launching position.

A further object of the present invention is to provide a store launching system which includes a magazine for storing and feeding successive flares automatically to the ejecting piston and cylinder assemblies mentioned above.

Yet another object of the present invention is to provide a fluid pressure actuated store launching system which includes a magazine-fed collapsible piston assembly and a cylinder assembly, both of which are relatively simple in operation and relatively inexpensive to manufacture. The invention includes a safety jettison system wherein the magazine and flares contained therewithin may be projected from the vehicle within which the systems are mounted.

The present invention fulfills the aforementioned objects and overcomes limitations and disadvantages of prior art solutions to problems. According to one aspect of the present invention, flares are stored within a magazine which is adapted to successively and automatically deliver flares to an ejector assembly. The ejector assembly includes an elongated cylinder assembly, including a cylinder member having an opening extending longitudinally therewithin and further having a longitudinal slot communicating with said opening and the exterior of the cylinder member. A flexible closure ribbon extends from end to end of the slot such that a fluid pressure-tight seal is maintained across the slot. A piston assembly is disposed within the cylinder opening and includes a piston member having a portion confined within the opening, a web portion integral with the confined portion which extends through the longitudinal slot, and an extending portion integral with the web portion which hingedly and collapsibly engages flares to be launched. This extending portion includes a rearward latch member which is spring-biased away from a collapsed position, the latch member engaging a rearward part of a flare before and during its being launched and, after launching of said flare, returning in a collapsed position against the underside of the next successive flare to be launched, against the biasing force of the associated spring. A sear-held rotatable forward latch assembly is pivotally connected to a forward end of the cylinder assembly and includes a latch member which engages the forward end of a flare prior to its being launched. A valved fluid supply means, upon actuation, conducts fluid under pressure to one side of the piston member, thereby causing the piston to travel during an ejecting stroke within the cylinder assembly, moving the flare with it. It is the pressure of the fluid causing the piston to so travel that simultaneously releases the sear-held forward latch assembly such that the flare being ejected will force the forward latch member to pivot out of its path. Valved fluid is thereafter supplied to the opposite end of the piston member after the launching stroke in order to initiate a return stroke wherein the piston assembly moves to its initial launching position.

The invention will be more clearly understood from the following description of a specific embodiment of the invention, together with the accompanying drawings, wherein similar reference characters denote similar elements throughout the several views, and in which:

FIG. 2 is a fragmentary elevation view of the ejector assembly according to the present invention;

FIG. 3 is an enlarged fragmentary sectional elevation view showing the piston assembly of the ejector system shown in FIG. 2;

FIG. 4 is a fragmentary elevation view of a portion of the piston assembly shown in FIG. 3 in a collapsed position;

FIG. 5 is a fragmentary plan view of the piston assembly shown in FIG. 3;

FIG. 6 is a sectional view taken along the line 6-6 of FIG. 2;

FIG. 7 is a fragmentary sectional elevation view of the sear-held forward latch assembly of the present invention.

Figure 1:
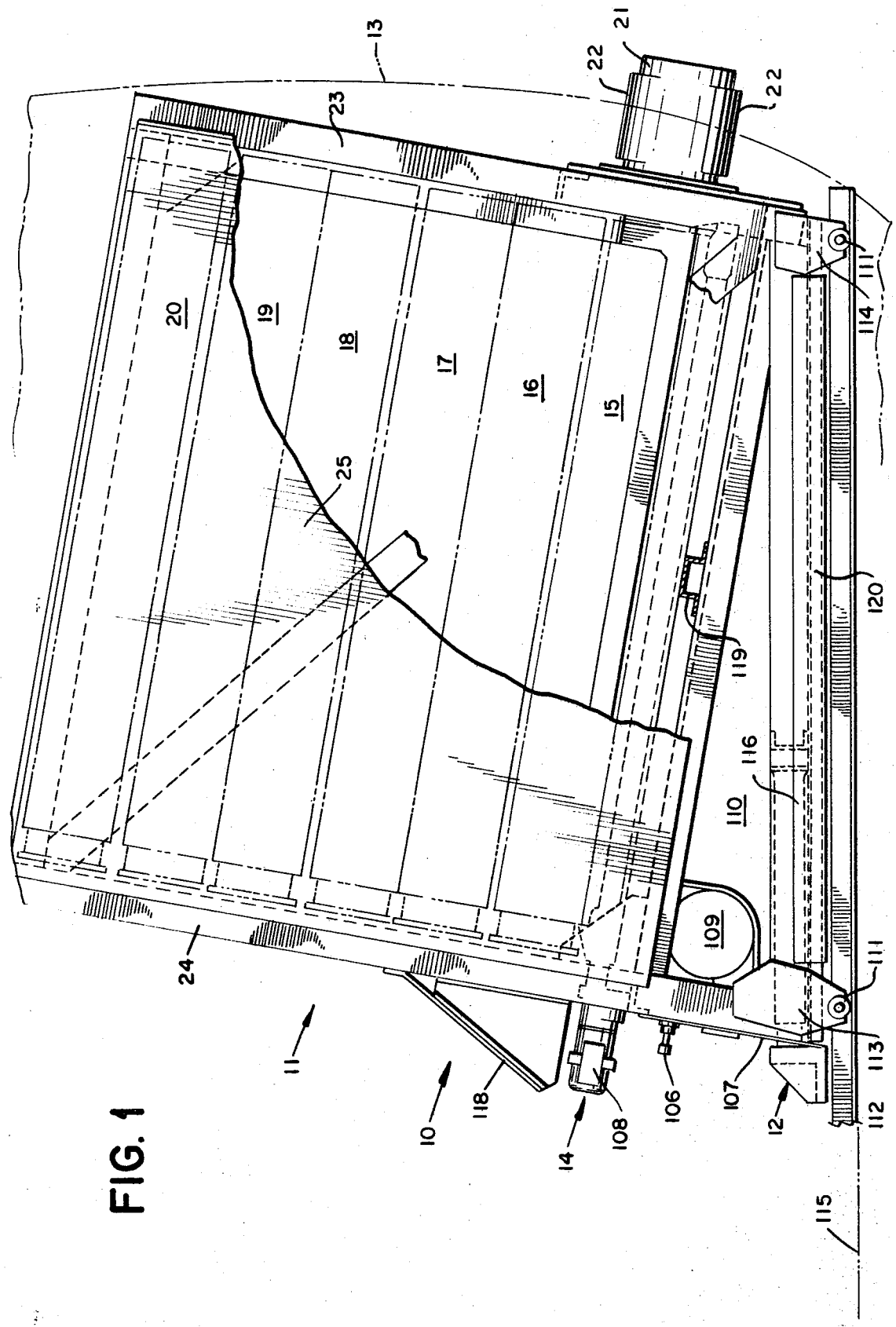
FIG. 1 is a fragmentary schematic elevation view showing one embodiment of the present invention.

Referring now in more detail to the drawings, FIG. 1 shows a launching structure 10 which includes a magazine assembly 11 supported atop a jettison assembly 12 within an aircraft, the skin line of the aircraft designated numeral 13. An ejector assembly 14 is shown within magazine assembly 11.

Magazine assembly 11 holds four columns of flares, six flares per column. Flares 15, 16, 17, 18, 19 and 20 represent one such column and will be used for purposes of illustration. Flare 15 is shown in a position in which it is ready to be launched or ejected through launch tube 21. Bosses 22 formed on launch tube 21 contain lanyard retainers, such as those of a conventional type.

Magazine assembly 11 includes forward frame members 23 and rearward frame members 24. A sheet 25, secured to frame members 23 and 24 forms one of the side walls of the magazine assembly.

Ejector assembly 14, more clearly seen in FIG. 2, includes an overall cylinder assembly 26 and piston assembly 27 (FIG. 3). Cylinder assembly 26 includes a cylinder member 28 having formed therewithin a longitudinally extending opening 29. A slot 30 communicates with opening 29 and the exterior of cylinder member 28. At the rearward end of cylinder assembly 26 a valve assembly 31 is provided for supplying fluid under predetermined sequenced pressures to the opening 29 within cylinder member 28. A fitting 32 is shown in FIG. 2 as being accessible to a fluid source external of the ejector assembly 14. Valve assembly 31 is adapted to supply fluid to the rearward end 33 of cylinder member 28 through the interface held fluid-tight by fasteners 34. Line 35 communicates with valve body 36 at one end thereof and with combination check and relief valve 37 threaded into cylinder member 28 at its opposite end.

FIG. 6 shows valve 37 as including a headed, threaded member 38 formed with male threads 39 which matingly engage female threads 40 in cylinder member 28. A ball 41 is shown in FIG. 6 engaging valve seat 42 such that fluid within opening 29 is unable to bypass ball 41 to enter conduit 43 which, in turn, communicates with line 35.

A closure ribbon 44 in the form of a substantially flat metallic strip is held taut against bearing surfaces 45 formed on either side of slot 30. A fluid-tight seal between opening 29 and the external portions of cylinder member 28 is maintained.

Piston assembly 27 includes a confined portion 46, a web portion 47, and an extending portion 48. Web 47 extends through slot 30 and holds extending portion 48 integrally with respect to confined portion 46. Confined portion 46 includes a sealing cup 49 (FIG. 5) and spacer member 50 held thereto by conventional means, such as flat-headed screw 121 (FIG. 6).

At the rearward end of confined portion 46, a sealing cup 51 is held to confined portion 46 by means of a threaded insert 52. It is within the scope of the present invention for the threads of screw 121 and the insert (not shown) to be identical such that the insert and spacer may be interchanged.

Extending portion 48 includes a square ring-shaped rearward latch member 53 having opposed arms 54 and 55 joined at one end by cross-member 56, the cross-member formed with vertically extending bearing face 57. Opposed arms 54 and 55, at their opposite end, are formed with projections 58 and 59, each of which is formed with bores 60 and 61, respectively, extending coaxially therethrough. Bores 62 and 63 are coaxially formed through projections 64 and 65, respectively, and thereafter through the opposed arms 54 and 55. A support piece 66 forms part of extending portion 48 and is formed with bore 67 which extends therethrough coaxially with respect to bores 60 and 61. A pin 68 extends through bores 60, 67 and 61, thereby pivotally securing rearward latch member 53 to support piece 66. Pin 68 is held in place with set screws 122 extending through member 53. A middle projection 69 is integral with support piece 66 and includes a cavity within which a small pin 70 may be fixed. A guide member 71 is pivotally and slidably connected to a forward rib 72 of extending portion 48. Forward rib 72 is formed with a slot 73 through which pin 74 extends. Pin 74 joins legs 75 and 76 of guide member 71 and is secured to these legs by means of set screws 77. Legs 75 and 76 are formed near their extremities with bores 78 and 79, respectively. A pin 80 extends through bores 63, 79, 78, and thereafter into 62, thereby pivotally joining guide member 71 with rearward latch member 53 such that the angle of pivotal movement of rearward latch member 53 is limited by the length of guide member 71. Pin 80 is held in place by set screws 123. Torsional springs 81 and 82 are each connected at one end thereof to an end of pin 70 and each extends around a sleeve 83 to the underside of legs 75 and 76, thereby biasing rearward latch member 53 upward away from forward rib 72.

FIG. 3 shows closure ribbon 44 extending into a cavity 84 within confined portion 46 of piston assembly 27. Closure ribbon 44 is guided internally of confined portion 46 by shoulders 85 and 86 having rounded surfaces in contact with the top surface of the ribbon. Aligned flat surfaces 87 and 88 formed in confined portion 46 further guide and bias the closure ribbon 44 against aforementioned bearing surfaces 45. In this way the fluid-tight seal between cylinder opening 29 and slot 30 is maintained despite movement of piston assembly 27 along cylinder assembly 26, shoulders 85 and 86 sliding along the top of ribbons 44 during such movement.

A forward latch assembly 89 is shown in FIG. 2 to be connected to the forward end of cylinder member 28 of cylinder assembly 26. FIG. 7 shows the latch assembly in more detail wherein a forward latch member 90 is pivotally secured to latch housing 91 by pin 92. A double-wrapped torsional spring 93 biases latch member 90 forward into the position shown in FIG. 7 wherein bearing surface 94 of the latch member extends substantially perpendicularly to the axis of the cylinder assembly. A sear-type lock 95 prevents pivotal movement of forward latch member 90 while engaged, as shown. Pressurization of cylinder opening 29 against the rearward end of confined portion 46 of piston assembly 27 will result in relative movement between latch housing 91 and cylinder member 28 away from one another. Sear piece 96 is secured to cylinder member 28 by spring pins 97 such that the aforedescribed movement of housing 91 and cylinder member 28 will result in sear piece 96 disengaging cam member 98, thereby permitting rotation of forward latch member 90 with respect to housing 91. Helical spring 99 is in a compressed state between shoulders of housing 91 and sear piece 96 such that sear piece 96 is biased toward cam member 98 and the locked state of forward latch member 90 will be achieved in the absence of launch pressurization.

Plug member 100 is located within opening 29 and is formed with a groove which receives O-ring 101, the O-ring bearing against surfaces defining opening 29 as well as against closure ribbon 44. Closure ribbon 44 is maintained in a stretched state by means of helical spring 102. Spring 102 is secured at end 103 to closure ribbon 44 and at its opposite end 104 to pin 105 fixed to sear piece 96.

In operation, flare 15 (FIG. 2) is in position to be ejected and is held between bearing surfaces 57 and 94 of rearward latch member 53 and forward latch member 90, respectively. Valve assembly 31 is actuated, such as by depression of button 106 on front control panel 107, which button will actuate the necessary pneumatic controls; or by depresssing the ejector manual release lever 108 (FIG. 1). Fluid under pressure is supplied from a source such as reservoir 109 held in place beneath magazine assembly 11 by support bracket 110. Upon valve assembly 31 opening, the launching or ejecting cycle is initiated and piston assembly 27 is urged down cylinder assembly 26 relatively slowly, because of reduced air flow through valve body 36, within which a slow-approach orifice is located, the air being supplied through such orifice (not shown). Upon bearing surface 57 of piston assembly 27 building up a force against flare 15, pressure reaction force is sensed by valve assembly 31 which automatically opens a reaction valve within valve body 36 to permit full air flow therethrough and resulting flare ejection pressure for flare ejection. It is this buildup of reaction pressure force which also causes the relative movement of housing 91 and cylinder member 28 away from one another such that sear piece 96 will disengage cam member 98, permitting pivotal movement of member 90. Full air flow behind piston assembly 27 will cause piston assembly 27 to move forward, pushing and ejecting flare 15 through launch tube 21, pivoting forward latch member 90 out of its way during ejection.

Upon flare 15 leaving launch tube 21, the reaction valve within valve body 36 automatically closes and the ejecting flare pressure is exhausted from cylinder opening 29. Thereafter, valve assembly 31 permits high pressure air to flow through line 35 and thereafter through valve 37, unseating ball 41 from seat 42 and introducing high pressure air against sealing cup 49 of the confined portion 46 of piston assembly 27, thereby urging piston assembly 27 rearwardly. Flare 16 by this time will be automatically dropping into the position originally occupied by flare 15 prior to the latter's being ejected, flare 16 bearing against the top of rearward latch member 53 and causing its collapsing against the biasing force of torsional springs 81 and 82. During the return stroke of piston assembly 27 to its original ejecting or launching position, rearward latch member 53 will slide along the underside of next successive flare 16 (FIG. 4).

The aforementioned launching cycle has a duration of approximately 0.5 second, while the total launching or ejecting cycle timed from piston assembly 27 leaving its initial position and returning to said position takes less than ten seconds. It is during this return stroke of piston assembly 27 that forward latch member 90 assumes its original position due to the biasing force of double-wrapped torsional spring 93.

It is within the scope of the present invention to provide an emergency jettison system which may be activated by either an automatic detection system, either heat or light-sensitive, or a manually operated switch. When activated the jettison system will eject the entire launching structure 10 through an opening in the vehicle within which it is mounted, such as the jump door of an aircraft. In one embodiment of the present invention, launching structure 10 is supported upon rollers 111 which, in turn, ride upon a guide track 112. Brackets 113 and 114 connect forward and rearward frame members 23 and 24, respectively, to the rollers. Guide track 112 may either be mounted upon or within aircraft floor 115. On actuation, the emergency jettison system will cause jettison actuator 116 to move member 117 toward the jump door, thereby ejecting the entire launching structure 10 through the jump door and free of the aircraft. This may be desirable in the event a flare is ignited and jams during ejection, or in the event any one or more of the flares in a magazine prematurely ignite.

It is further within the scope of the present invention that the launch structure 10 be jettisoned from either the launch position, as shown in FIG. 1, or from a stowed position (not shown). A false floor may be used with the latter system. Optional features of the present invention may be included, depending upon the feasibility of weight penalty. These include a shield member 118 (FIG. 1) which will protect the ejector manual release lever 108 and pneumatic controls, such as button 106 on front panel 107, from accidental depression or damage. Channel support members, such as member 119, may be provided to support portions of cylinder assembly 26. In addition, base armor, designated numeral 120 in FIG. 1, may be positioned above the aircraft floor to protect the store launching system from small arms fire.

Other safety features, including audible warning devices and ground safety locks which will prevent jettisoning of the launching structure 10 in the event the system is inadvertently actuated are within the scope of the present invention.

The embodiments of the invention particularly disclosed are presented merely as examples of the invention. Other embodiments, forms and modifications of the invention coming within the proper scope of the appended claims, will of course readily suggest themselves to those skilled in the art.

I claim:

1. A fluid pressure actuated launching system, comprising a cylinder assembly having an opening extending longitudinally therewithin and forming a longitudinal slot communicating with said opening and the exterior of the cylinder assembly, closure means for sealing portions of said longitudinal slot, and a linearly movable piston assembly linearly movable during ejection and return strokes, an interior portion of said piston assembly being movably disposed within the cylinder opening and having an exterior portion integral with said interior portion, said exterior portion comprising hinged means for successively forcibly moving objects during said ejection stroke, said hinged means including a pivotally movable rear latch member which is spring-biased from a collapsed position toward an ejection position said rear latch member being pivotally movable toward said collapsed position during said return stroke.

2. The system according to Claim 1, wherein said cylinder assembly comprises a cylinder member formed with interior surfaces defining said opening and further formed with edges defining said slot, said interior surfaces and edges joining in flat bearing surfaces on either side of said slot, a flexible substantially flat closure ribbon portions of which are in contact with said flat bearing surfaces, a plug member disposed within said opening for providing a fluid-tight seal of said opening, valve means for preventing fluid flow from said opening to points external of said cylinder member, said valve means permitting fluid flow therethrough into said opening of the cylinder member, and forward latch means for engaging an object to be moved.

3. The system according to Claim 2, further comprising first fluid supply means for urging said piston assembly in an ejection direction, and second fluid supply means communicating with said valve means for urging said piston assembly in a return direction.

4. The launching system according to Claim 3, wherein said piston assembly comprises a piston member including confined and extending portions integrally interconnected by a web portion, said confined portion movably disposed within said opening, said web portion extending through said slot, said extending portion including a support member formed with first and second holes extending transversely through rear and middle projections, respectively, said middle projection further formed with a transversely extending slotted aperture therethrough, a first pin journalled in said first hole such that ends thereof extend from opposite transverse sides of said rear projection, said rear latch member being secured to the ends of said first pin for pivotal movement with respect to said cylinder assembly, said rear latch member including a pair of spaced coaxial third holes formed by side portions thereof, a second pin fixedly disposed within said second hole such that ends thereof extend from opposite sides of said middle projection, a third pin extending between and into said third holes and being fixed therewithin, a fourth pin extending transversely through said slotted aperture, a guide member hingedly connected at one end thereof to said fourth pin and at its opposite end to said third pin, a torsion reactive spring secured at one end thereof to said second pin and at its opposite end to said third pin thereby biasing said rear latch member away from said support member.

5. The system according to Claim 4, wherein said forward latch means includes a housing, a forward latch member pivotally connected to said housing, a torsion spring connected at one end thereof to said housing and at its opposite end in contact with said forward latch member thereby biasing the latter toward a position normal with respect to the longitudinal axis of the cylinder member.

6. The system according to Claim 5, further comprising sear means for releasably restraining said forward latch member from movement prior to movement of said object.

7. A fluid pressure actuated launching system, comprising: an elongated cylinder assembly, comprising a cylinder member having an opening extending longitudinally therewithin, said member forming a longitudinal slot communicating with said opening and the exterior of the cylinder member, a portion of said opening being bounded by a flat inner surface formed by the cylinder member adjacent inner edges of the slot, a flexible substantially flat closure ribbon extending from end to end of said opening and of a width substantially equal to the width of said flat surface, said ribbon disposed at points along its length such that edges thereof are in contact with said flat surface such that a transverse line extending across said ribbon will be a chord of a circle defined by inner surfaces of said cylinder bounding said opening, said ribbon having a portion deflected toward a longitudinal axis of said cylinder member; and a piston assembly comprising a piston member including a confined portion and an extending portion and having aligned chordal flat surfaces at end portions thereof contacting a surface of said ribbon, said piston member being formed with an elongated cavity within said confined portion communicating with said chordal flat surfaces for housing portions of said ribbon extending between the surfaces of the ribbon in contact with said chordal flat surfaces, said confined portion including sealing means in contact with the surfaces forming said opening for impeding fluid flow thereby, said confined portion movably disposed within said opening and being integrally connected to said extending portion by a web portion extending through said slot, said extending portion including a support member formed with first and second holes extending transversely through rear and middle projections, respectively, said middle projection further formed with a transversely extending slotted aperture therethrough, a first pin journalled in said first hole such that ends thereof extend from opposite transverse sides of said rear projection; a rear latch member secured to the ends of said first pin for pivotal movement with respect to said cylinder assembly, said rear latch member including a pair of spaced coaxial third holes formed by side portions thereof, a second pin fixedly disposed within said second hole such that ends thereof extend from opposite sides of said middle projection, a third pin extending between and into said third holes and being fixed therewithin, a fourth pin extending transversely through said slotted aperture, a guide member hingedly connected at one end thereof to said fourth pin and at its opposite end to said third pin. A torsion reactive spring secured at one end thereof to said second pin and at its opposite end to said third pin thereby biasing said rear latch member away from said support member.

8. A fluid pressure actuated launching system according to Claim 7, further comprising a rotatable latch assembly connected to said cylinder assembly and including a forward latch member spring-biased to a position substantially normal with respect to the longitudinal axis of said cylinder assembly for engaging a forward end of a store to be launched, said rear latch member engaging a rearward end of said store prior to launching thereof.

9. A store launching system for use with a vehicle, comprising a cylinder assembly having an opening extending longitudinally therewithin and forming a longitudinal slot communicating with said opening and the exterior of the cylinder assembly, closure means for sealing portions of said longitudinal slot, a linearly movable piston assembly linearly movable during ejection and return strokes, an interior portion of said piston assembly being movably disposed within the cylinder opening and having an exterior portion integral with said interior portion, said exterior portion comprising hinged means for successively forcibly ejecting stores during said ejection stroke, said hinged means including a pivotally movable rear latch member which is spring-biased from a collapsed position toward an ejection position, said rear latch member being pivotally movable toward said collapsed position during said return stroke, and magazine means for holding and successively supplying stores to said cylinder assembly.